(12) United States Patent
Twelves, Jr. et al.

(10) Patent No.: US 10,563,537 B2
(45) Date of Patent: Feb. 18, 2020

(54) ENERGY ABSORBING BEAM AND SANDWICH PANEL STRUCTURE

(71) Applicant: United Technologies Corporation, Hartford, CT (US)

(72) Inventors: Wendell V. Twelves, Jr., Glastonbury, CT (US); Evan Butcher, Manchester, CT (US); Lexia Kironn, Rocky Hill, CT (US); Joe Ott, Enfield, CT (US); Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 875 days.

(21) Appl. No.: 15/017,127

(22) Filed: Feb. 5, 2016

(65) Prior Publication Data

US 2017/0226891 A1 Aug. 10, 2017

(51) Int. Cl.
*F01D 25/00* (2006.01)
*F01D 25/24* (2006.01)
(Continued)

(52) U.S. Cl.
CPC .............. *F01D 25/005* (2013.01); *B32B 3/02* (2013.01); *B32B 3/08* (2013.01); *B32B 9/005* (2013.01);
(Continued)

(58) Field of Classification Search
CPC ....... B32B 15/00; B32B 15/01; B32B 15/012; B32B 15/013; B32B 15/015; B32B 15/016; B32B 15/017; B32B 15/043; B32B 15/088; B32B 15/14; B32B 15/18; B32B 15/20; B32B 2250/04; B32B 2262/0269; B32B 2307/56; B32B 2571/02; B32B 27/34; B32B 3/02; B32B 3/08; B32B 3/28; B32B 9/005; B32B 9/041; E04C 2/326; F01D 21/045; F01D 21/10; F01D 25/005;
(Continued)

(56) References Cited

U.S. PATENT DOCUMENTS 4,012,549 A 3/1977 Slysh
5,409,349 A 4/1995 Kulak et al.
(Continued)

FOREIGN PATENT DOCUMENTS

WO WO9530075 A1 11/1995
WO WO2004055467 A1 7/2004
(Continued)

OTHER PUBLICATIONS

Extended European Search Report for EP Application No. 17154698.9, dated May 8, 2017, 8 Pages.
(Continued)

*Primary Examiner* — Kenneth Bomberg
*Assistant Examiner* — Julian B Getachew
(74) *Attorney, Agent, or Firm* — Kinney & Lange, P.A.

(57) ABSTRACT

An apparatus includes first, second, and third layers. The first layer includes a plurality of flanges. The second layer includes a deformable membrane. The second layer is connected to the first layer along a first major surface of the deformable membrane. The third layer is connected to the second layer along a second major surface of the deformable membrane opposite the first major surface. The third layer includes a first series of internal structures.

17 Claims, 9 Drawing Sheets

(51) Int. Cl.
  *B32B 15/01* (2006.01)
  *F01D 21/04* (2006.01)
  *F01D 21/10* (2006.01)
  *F41H 5/04* (2006.01)
  *B32B 15/00* (2006.01)
  *B32B 15/18* (2006.01)
  *B32B 27/34* (2006.01)
  *B32B 15/14* (2006.01)
  *B32B 15/04* (2006.01)
  *B32B 9/04* (2006.01)
  *B32B 15/20* (2006.01)
  *B32B 3/08* (2006.01)
  *B32B 3/02* (2006.01)
  *B32B 15/088* (2006.01)
  *B32B 9/00* (2006.01)

(52) U.S. Cl.
  CPC ............. *B32B 9/041* (2013.01); *B32B 15/00* (2013.01); *B32B 15/01* (2013.01); *B32B 15/011* (2013.01); *B32B 15/012* (2013.01); *B32B 15/013* (2013.01); *B32B 15/015* (2013.01); *B32B 15/016* (2013.01); *B32B 15/017* (2013.01); *B32B 15/043* (2013.01); *B32B 15/088* (2013.01); *B32B 15/14* (2013.01); *B32B 15/18* (2013.01); *B32B 15/20* (2013.01); *B32B 27/34* (2013.01); *F01D 21/045* (2013.01); *F01D 21/10* (2013.01); *F01D 25/24* (2013.01); *F41H 5/04* (2013.01); *F41H 5/0442* (2013.01); *B32B 2250/04* (2013.01); *B32B 2262/0269* (2013.01); *B32B 2307/56* (2013.01); *B32B 2571/02* (2013.01); *Y02T 50/672* (2013.01)

(58) Field of Classification Search
  CPC .. F01D 25/24; F16F 7/121; F41H 5/04; F41H 5/0442
  USPC ...... 428/116; 52/782.1, 783.1, 783.11, 789.1
  See application file for complete search history.

(56) References Cited

U.S. PATENT DOCUMENTS

| | | | |
|---|---|---|---|
| 6,575,694 B1* | 6/2003 | Thompson | F01D 21/045 415/173.4 |
| 8,297,912 B2* | 10/2012 | Reed | F01D 21/045 415/220 |
| 2011/0239851 A1 | 10/2011 | Mason et al. | |

FOREIGN PATENT DOCUMENTS

| | | |
|---|---|---|
| WO | WO2012065155 A1 | 5/2012 |
| WO | WO2014093290 A1 | 6/2014 |

OTHER PUBLICATIONS

Helmets.org, "Bicycle Helmet Liners: Foam and Other Materials", website <http://www.helmets.org/liners.htm>, 18 pages, Updated Jan. 20, 2016.

Cash+Butterfly Biomimicry (/blog/bursts/cash-butterfly-biomimircy), by Leigha (/user/leigha), website <http://www.sciencebuzz.org/buzz_tags/money>, 10 pages, Dec. 16, 2011.

Communication Pursuant to Article 94(3) EPC for EP Application No. 17154698.9, dated Sep. 5, 2019, 6 pages.

* cited by examiner

ENERGY ABSORBING BEAM AND SANDWICH PANEL STRUCTURE

BACKGROUND

The present disclosure relates generally to ballistic containment structures, and more particularly to a sandwich panel with a variable stiffness response for use in ballistic containment systems.

Structures designed for dealing with ballistic events, such as a blade out event for a fan case or the forward bearing support structure of a gas turbine engine, are typically constrained by the mechanical properties of the materials used in the structures. In a blade out event, one or more fan blades or portions thereof in a turbine engine are released, for example, as a result of the ingestion of a foreign object (e.g., a bird). In such an event, the released fan blade must be contained so as not to penetrate the fan case. In addition, after a blade out event the fan case must retain its structural integrity while the engine shuts down in order to prevent further potentially catastrophic damage. Despite these significant ballistic requirements on the fan case, the fan case is a large structure which contributes significantly to the overall weight and drag of the engine. Among the many challenges faced by a person of skill in the art is how to balance the ballistic requirements of the fan case with the competing weight and size constraints. Thus, a high strength fan containment case is of value.

SUMMARY

An apparatus includes first, second, and third layers. The first layer includes a plurality of flanges. The second layer includes a deformable membrane. The second layer is connected to the first layer along a first major surface of the deformable membrane. The third layer is connected to the second layer along a second major surface of the deformable membrane opposite the first major surface. The third layer includes a first series of internal structures.

A method includes receiving a ballistic article with a structure. The structure is deformed to absorb energy from the ballistic article. A first layer of the structure is displaced towards a second layer and a third layer of the structure. The second layer is bent at joints formed at intersection points of flanges in the first layer and the second layer. An external surface of the third layer is extended such that at least a portion of the external surface of the third layer is changed from a sinusoidal shape to either a first shape with a generally uniform curvature or a second shape with substantially straight portions between intersection points.

The present summary is provided only by way of example, and not limitation. Other aspects of the present disclosure will be appreciated in view of the entirety of the present disclosure, including the entire text, claims and accompanying figures.

Figure 1:
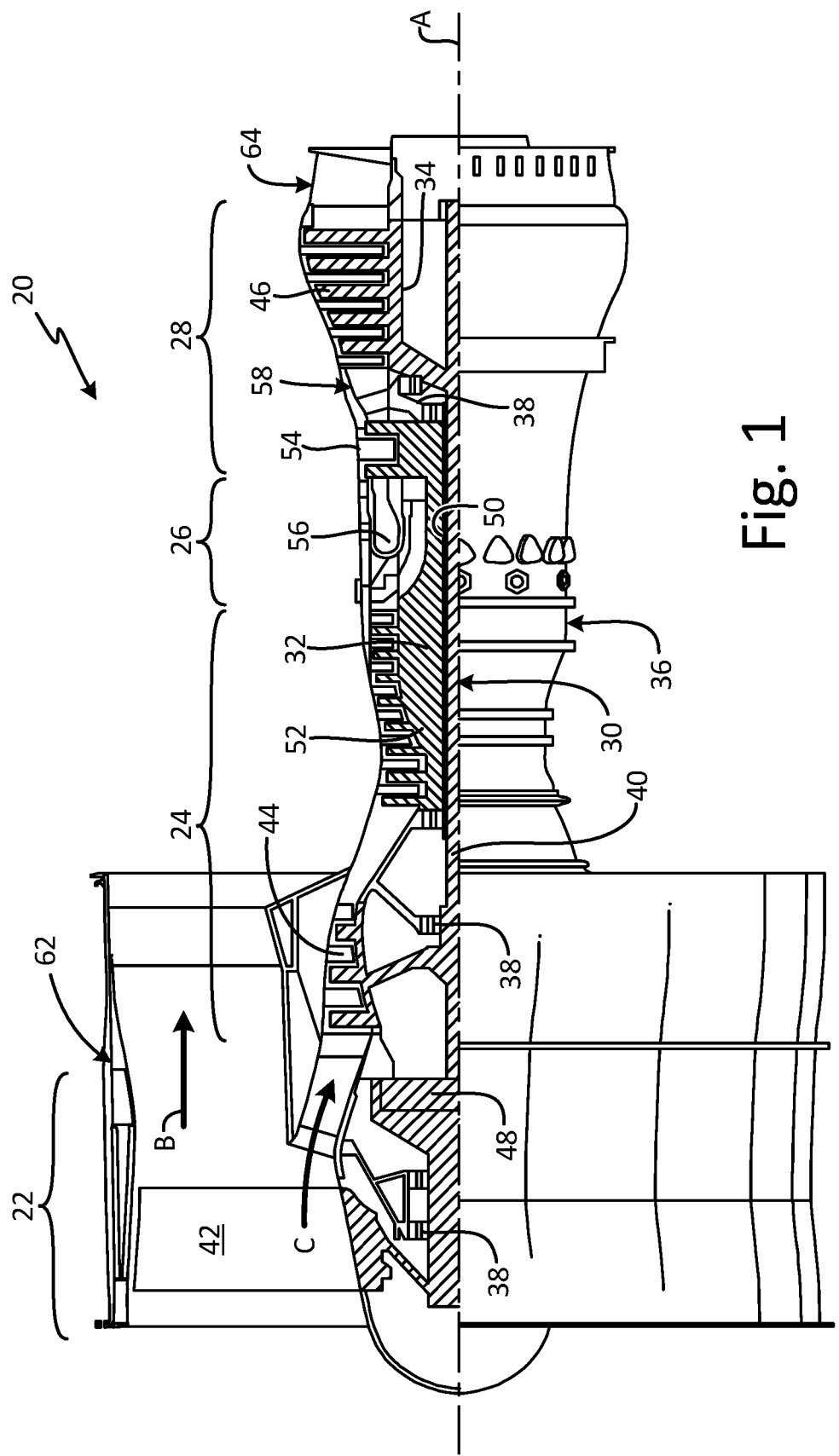
FIG. 1 is a quarter section view of an embodiment of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Structures designed for dealing with ballistic events, such as a blade out event for a fan case or the forward bearing support structure of a gas turbine engine, are typically constrained by the mechanical properties of the materials used in the structures. Material strain rate characteristics and elongation are among the key parameters for ballistic containment and protection systems, specifically for aircraft applications or other applications such as bulletproofing. Increasing material thickness and adopting multi-material architectures are effective methods of improving ballistic performance. However, increasing material thickness incurs both a weight and a size penalty. A multi-material approach may reduce weight, but it will typically increase both complexity and weight.

Another method of improving the survivability of ballistic events is to increase the geometric complexity of the structure with crush and flexure features (e.g., honeycomb panels or corrugated sheet metal) such that a degree of energy absorption is provided by the structure, which effectively reduces a magnitude of load spikes. However, there are increases in time and manufacturing processes typically associated with forming and joining energy absorbing shapes. Current non-additive manufacturing techniques are limited in their capability to create complex internal geometries for ballistic containment systems.

A need exists for a novel structural architecture that will offer the energy absorbing characteristics and weight savings of complex geometry in combination with an affordable fabrication method.

The present disclosure provides a variable moment of inertia beam or sandwich panel structure characterized by a compliant tension flange and a gapped compression flange for use in ballistic containment systems, which can be manufactured using additive manufacturing techniques. The progressive stiffening characteristics of the structure effectively attenuate the shock of sharp load spikes experienced in ballistic event settings and allow for less material to be used to produce a desired ballistic performance. The present disclosure teaches that a sandwiched or multi-layer construction with suitable flange or face sheet features coupled with a truss style shear web or core will allow the stiffness response of a beam or sandwich panel to be tailored for specific ballistic response characteristics. Current and near term additive manufacturing machinery featuring multiple lasers or electron beams can provide a suitable fabrication method for the sandwiched or layered geometry.

FIG. 1 is a quarter section view of gas turbine engine 20 that includes fan section 22, compressor section 24, combustor section 26, and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. It should be further understood that the disclosed non-limiting embodiment provides generally a ballistic barrier that is suitable for many types of rotating or rotary machines as known to those of ordinary skill in the art.

Example gas turbine engine 20 generally includes low speed spool 30 and high speed spool 32 mounted for rotation about engine central longitudinal axis A. Example gas turbine engine 20 generally also includes turbine rotors 34. Low speed spool 30 and high speed spool 32 rotate relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 directly, or through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

Airflow along core flow path C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are along core flow path C and function as an inlet guide vane for low pressure turbine 46.

Fan section 22 is surrounded by fan containment case 62, including a ballistic structure to absorb impacts from one or more fugitive fan blades in a blade-off condition, which may occur due to a foreign object damage (FOD) event, such as a bird strike.

Figure 2A:
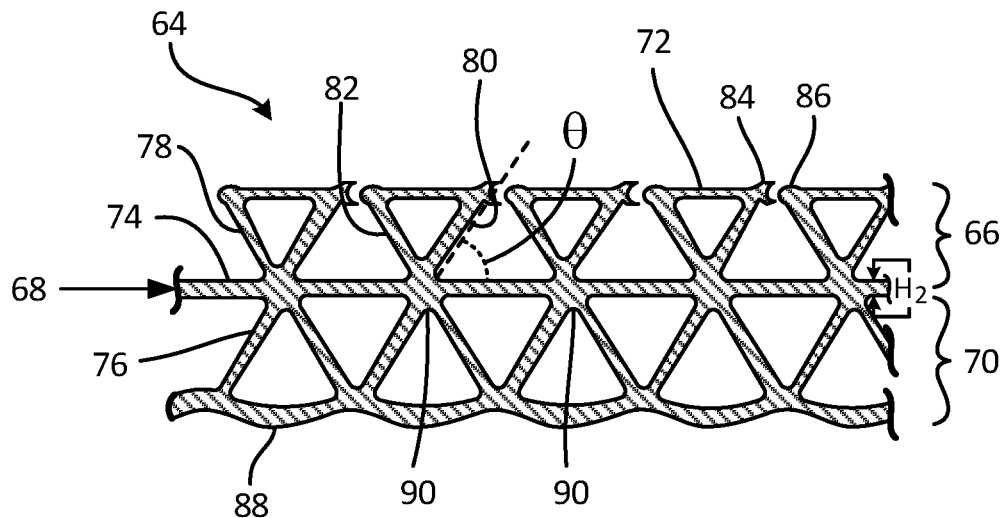
FIG. 2A is a cross-sectional view of a ballistic structure according to one embodiment of the present disclosure, shown in a first position.

FIG. 2A is a cross-sectional view of ballistic structure 64 according to one embodiment of the present disclosure, shown in a first position. Ballistic structure 64 includes first layer 66, second layer 68, and third layer 70. First layer 66 includes flanges 72. Second layer 68 includes deformable membrane 74. Third layer 70 includes first set of internal structures 76. In the illustrated embodiment of FIG. 2A, first layer 66 is connected to a first major surface of second layer 68 and third layer 70 is connected to second layer 68 along a second major surface of deformable membrane 74. Each of first layer 66, second layer 68, and third layer 70 can include materials such as aluminum, titanium, and alloys thereof, as well as other metallic materials.

Flanges 72 include second set of internal structures 78, and each of flanges 72 include first face 80 and second face 82. Each of first face 80 and second face 82 form angle $\Delta_A$ with deformable membrane 74 in an un-deformed state. In this example, angle $\theta$ is an acute angle. In other examples, angle $\theta$ can be an obtuse angle. First set of internal structures 76 and second set of internal structures 78 can be triangular or generally triangular shapes, but can also include other various shapes or geometries. Moreover, other characteristics such as thicknesses and sizes, can be selected to achieve desired performance characteristics such as stiffness, energy absorption, and elasticity of ballistic structure 64. First set of internal structures 76 and second set of internal structures 78 can include any engineered structure and/or matrix, random structures such as a sponge-like structure with elements of random size and shape, a flexible material that fills the space (a material such as a polymer, rubberized material, or any other material with a desired rate of flexion), a fluid (gas or liquid) at ambient pressure and/or a fluid under pressure in between first layer 66, second layer 68, and third layer 70.

Each of flanges 72 include first nesting feature 84 and second nesting feature 86. First nesting feature 84 is positioned on first face 80 and second nesting feature 86 is positioned on second face 82. First nesting feature 84 includes a first shape to engage a second shape of second nesting feature 86 such that first nesting feature 84 is configured to receive second nesting feature 86. In this example, first nesting feature 84 includes a joint shape and second nesting feature 86 includes a ball shape such that when first nesting feature 84 and second nesting feature 86 are joined together (as shown in FIG. 2B), the ball shape of second nesting feature 86 fits within the joint shape of first nesting feature 84 to provide frictional damping between first face 80 and second face 82.

Figure 2B:
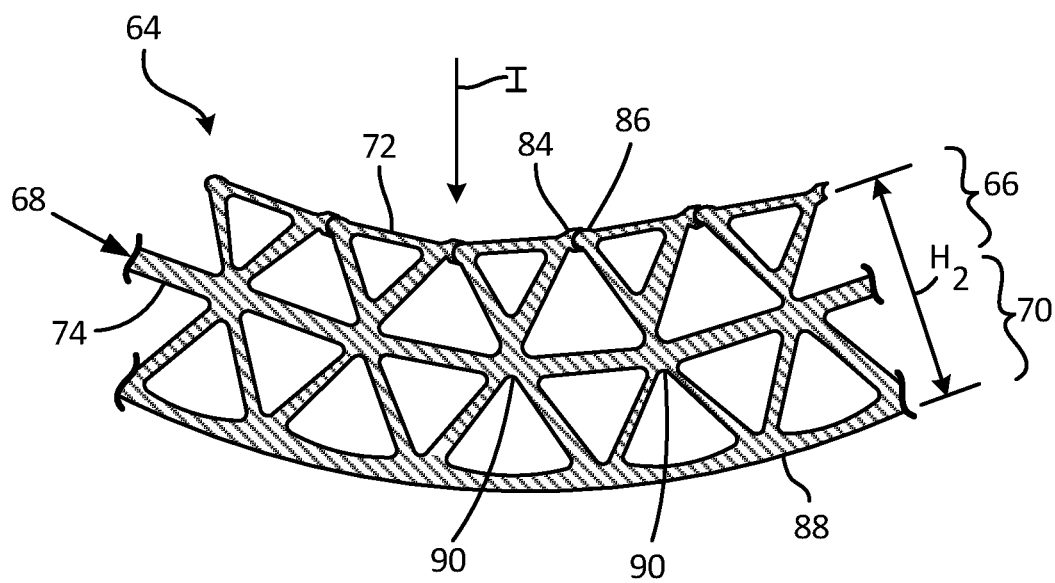
FIG. 2B is a cross-sectional view of the ballistic structure of FIG. 2A, shown in a second position.

In FIG. 2A, thickness $H_1$ of deformable membrane 74 is approximately 1/10 of thickness $H_2$ of ballistic structure 64 as shown in FIG. 2B. Thickness $H_1$ and thickness $H_2$ can be varied in other examples to provide varying amounts of stiffness to ballistic structure 64. In this example, a stiffness of ballistic structure 64 is a cubic function of the thickness of ballistic structure 64. For example, the stiffness of ballistic structure 64 is equivalent to $H_2\string^3$ newtons per meter.

First set of internal structures 76 include exterior surfaces 88 on an opposite side of third layer 70 as deformable membrane 74. In this example, exterior surfaces 88 include curved shapes resulting in a generally sinusoidal shape extending across third layer 70, but exterior surfaces 88 may also include other linear and non-linear shapes in other examples. Joints 90 are formed at intersections points of flanges 72 and second layer 68.

Traditional non-additive manufacturing methods can be used in forming ballistic structure 64. These methods often include: brazing; riveting which results in bulky, heavy joints requiring large amounts of inspection time; complex tooling; and other similar issues presenting structural, size, and strength issues in a structure. Therefore, due to the complex form of ballistic structure 64, additive manufacturing methods can be useful in achieving the geometries and complex joints of ballistic structure 64. Additive manufacturing allows for a very fine scale/resolution of the features of ballistic structure 64 and to grow complex structures within ballistic structure 64. Types of additive manufacturing that can be used to form ballistic structure 64 include laser sintering, powder based, electron beam, wire fed, and laser powder deposition additive manufacturing methods.

FIG. 2B is a cross-sectional view of ballistic structure of 64, which is representative of ballistic structure 64 shown in a second position. The position of ballistic structure 64 is simulating a ballistic impact (schematically represented by arrow I) received by first layer 66 causing ballistic structure 64 to deform into a concave upward position, with first layer 66 towards the concave direction. As ballistic structure 64 deforms, energy from the ballistic impact is absorbed throughout ballistic structure 64.

As ballistic structure 64 is deformed, first layer 66 is displaced towards second layer 68 and third layer 70. Second layer 68 is bent at joints 90. Exterior surfaces 88 of third layer 70 are extended such that external surfaces 88 are changed from the sinusoidal shape (as shown in FIG. 2A) to a shape with a generally uniform curvature. Extending exterior surfaces 88 to a generally uniform curvature includes curving exterior surfaces 88 to a pre-determined amount of curvature. The pre-determined amount of curvature of exterior surfaces 88 can be set to achieve desired energy absorption rates of ballistic structure 64. In some instances, only a portion (but not all) of external surfaces 88 change shape.

Additionally, as ballistic structure 64 is deformed, adjoining flanges 72 are compressed together along first layer 66. First nesting feature 84 and second nesting feature 86B of adjoining flanges 72 become engaged and provide frictional damping to the relative motion between adjoining flanges 72. It should be recognized that other frictionally damping features can be utilized in alternate embodiments. The nesting features are shown by way of example and not limitation.

Deformable membrane 74 is relatively thin and easily deformed. As ballistic structure 64 is deformed to create a concave upward curvature, the compliant, wavy exterior surfaces 88 (shown in FIG. 2A) exert progressive increasing tension resistance as they are straightened to exterior surfaces 88. At the same time, adjoining flanges 72 are compressed along first layer 66, driving the solidification point of first layer 66 outboard to the tips of flanges 72. As adjoining flanges 72 are compressed, first nesting feature 84 and second nesting feature 86 engage providing a significant friction load offering a torsional damping mechanism for ballistic structure 64. The torsional damping mechanism of first nesting feature 84 and second nesting feature 86 provide an additional energy dissipation mechanism when ballistic structure 64 experiences a 3D deformation during a ballistic event. First nesting feature 84 and second nesting feature 86 do not become fully engaged until the pre-determined amount of curvature of exterior surfaces 88 is reached.

In ballistic structure 64, an effective moment of inertia varies with beam or panel deflection as first layer 66 and second layer 68 progressively pick up load at an extended distance from the neutral axis. The compliance inherent in the progressive stiffening characteristic of the structure effectively attenuates the shock of sharp load spikes.

As the deflection of ballistic structure 64 increases, the stiffness of ballistic structure 64 also increases. With the moment of inertia being a cubic function of depth, between the first position shown in FIG. 2A with only deformable membrane 74 resisting deformation and the fully deformed shape of ballistic structure 64 with first nesting feature 84 and second nesting feature 86 fully engaged show in FIG. 2B, the stiffness ratio of ballistic structure 64 can be easily tailored to exceed 1000:1. Note that a 2D cross section is shown in FIGS. 2A and 2B, but the ballistic benefits described in this disclosure will also apply to conformal 3D panels.

The geometry of ballistic structure 64 allows for the ballistic performance not to be dependent only on the mechanical properties of the materials used. Instead, ballistic structure 64 allows for a complex mechanical response out of a passive mechanical structure. A desired mechanical response of ballistic structure 64 can also be achieved through varying any or all of the following: thickness of all elements in ballistic structure 64, number and size of flanges 72, degree of separation between adjoining flanges 72, number and size of nesting features 84 and 86, geometries of structures 76 and 78, and selection of materials used such as metals, metallic alloys, polymers, plastics, and/or materials with specific moduli. Additional layers can be added to ballistic structure 64, with a material of potential additional layers possibly including ceramics, ceramic matrix composites, aramids, aromatic polyamides, and para-aramid synthetic fibers.

Figure 3:
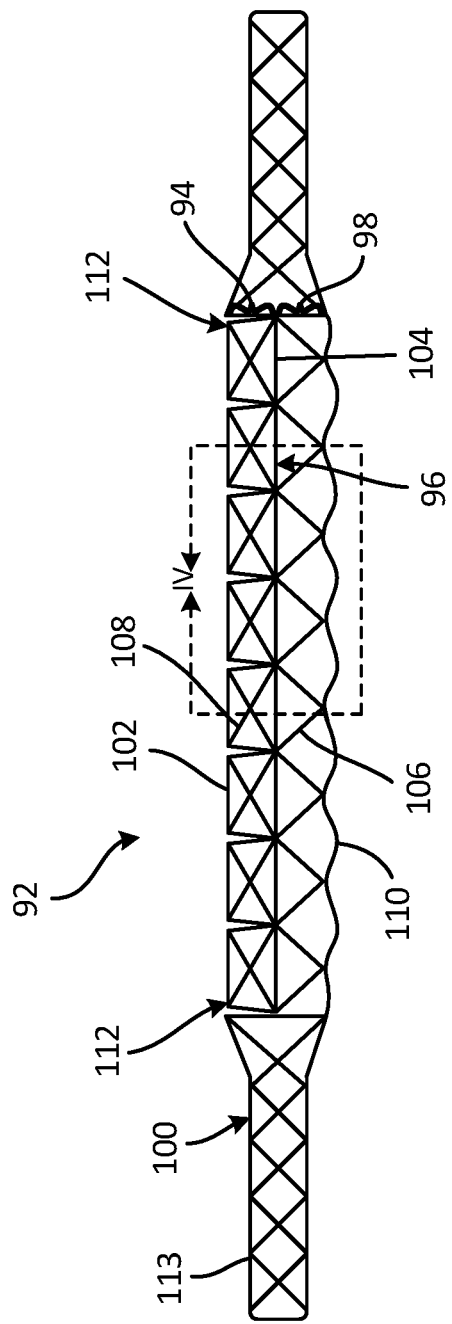
FIG. 3 is a cross-sectional view of a ballistic structure according to another embodiment.

FIG. 3 is a cross-sectional view of ballistic structure 92 according to another embodiment. Ballistic structure 92 includes first layer 94, second layer 96, third layer 98, and support structure 100. First layer 94 includes a plurality of flanges 102. Second layer 96 includes deformable membrane 104. Third layer includes first internal structures 106. Flanges 102 include second internal structures 108. First internal structures 106 include exterior surfaces 110. Support structure 100 includes frame 113 surrounding longitudinal edges 112 of first layer 94, second layer 96, and third layer 98.

Figure 4A:
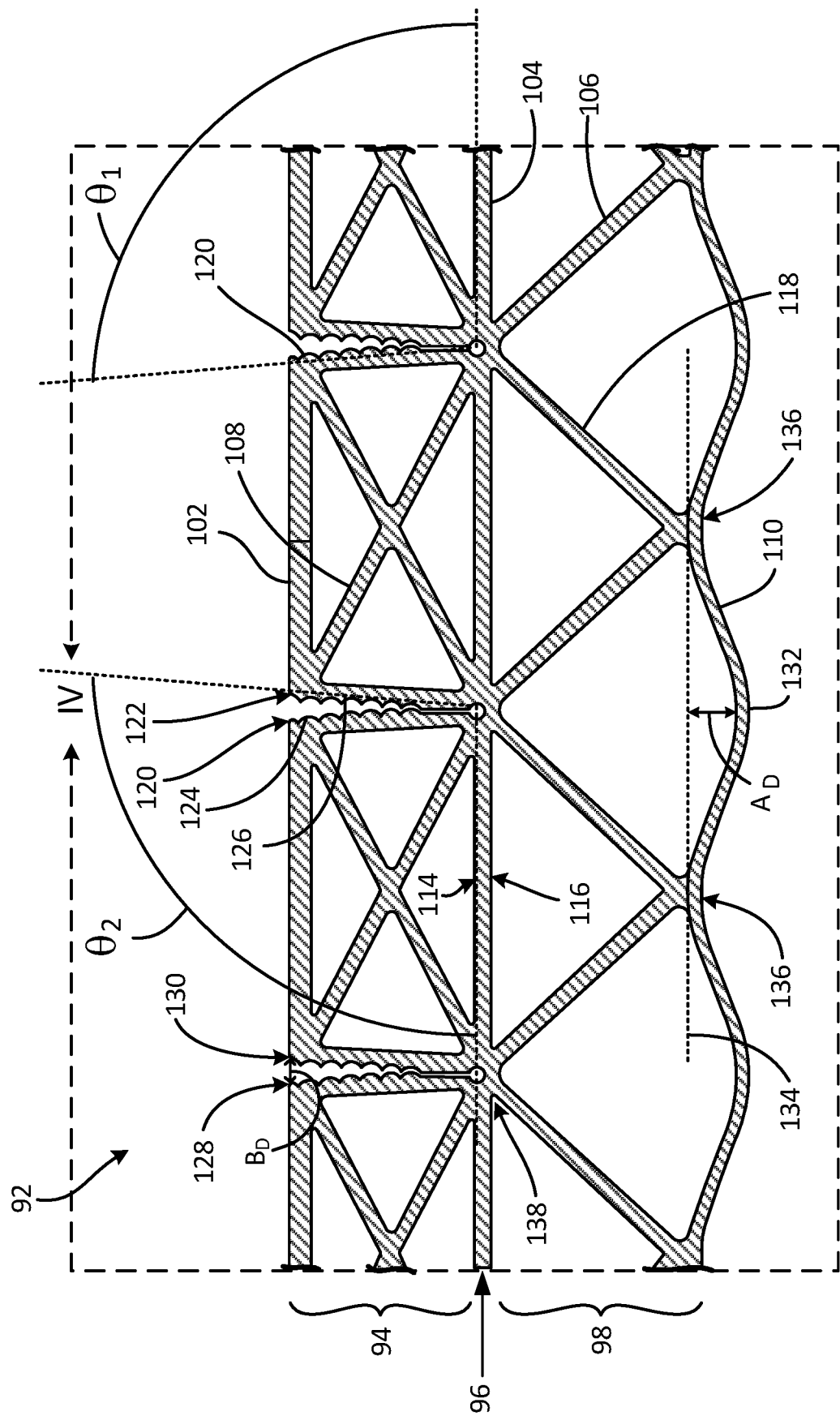
FIG. 4A is an enlarged cross-sectional view of the ballistic structure of FIG. 3.

FIG. 4A is an enlarged cross-sectional view of ballistic structure 92 from FIG. 3. Ballistic structure 92 includes first layer 94, second layer 96, and third layer 98. First layer 94 includes a plurality of flanges 102. Second layer 96 includes deformable membrane 104. Third layer 98 includes first internal structures 106. Flanges 102 include second internal structures 108. First internal structures 106 include exterior surfaces 110. Deformable membrane 104 includes first major surface 114 and second major surface 116. First major surface 114 of deformable membrane is connected to first layer 94 and second major surface 116 of deformable membrane 104 is connected to third layer 98. In the illustrated embodiment, each of first internal structures 106 includes structure elements 118 that form a triangle with and are connected to second major surface 116 of deformable membrane 104.

Each of flanges 102 include first face 120 and second face 122. First face 120 forms angle $\theta_1$ with deformable membrane 104 in an un-deformed state. Second face 122 forms angle $\theta_2$ with deformable membrane 104 in an un-deformed state. In this example, angles $\theta_1$ and $\theta_2$ are each obtuse angles. In other examples, angles $\theta_1$ and $\theta_2$ can be acute angles.

Each of flanges 102 include first nesting feature 124 and second nesting feature 126. First nesting feature 124 is positioned on first face 120 and second nesting feature 126 is positioned on second face 122. First nesting feature 124 includes a first shape to engage a second shape of second nesting feature 126 such that first nesting feature 124 is configured to receive second nesting feature 126. In this example, first nesting feature 124 includes tongues 128 and second nesting feature 126 includes grooves 130 such that when tongues 128 and grooves 130 are joined together, first nesting feature 124 engages with second nesting feature 126 to provide torsional friction damping when ballistic structure 92 experiences distortion. The quantity, size, and spacing of first nesting feature 124 and second nesting feature 126 can be varied to achieve desired performance characteristics of ballistic structure 92. Additionally, an amount of separation between first face 120 and second face 122, as well as degrees of curvature of first face 120 and second face 122, can be varied to control the rate of engagement between first face 120 and second face 122 and, as a result, how quickly ballistic structure 92 achieves a specific stiffness threshold.

In an un-deformed state, each of exterior surfaces 110 include apex 132 located at a midpoint of each of exterior surfaces 110. Apex 132 is located at distance $A_D$ from plane 134. Plane 134 includes a series of intersection points 136 between structure elements 118A and exterior surfaces 110. Distance $A_D$ includes an absolute value of zero or greater than zero. In this example, the value of distance $A_D$ is greater than zero. Distance $A_D$ will be matched to distance $B_D$ between first face 120 and second face 122 at an outboard extremity of flanges 102. In one embodiment the geometry will be configured such that deformation will simultaneously match closing flanges 102 at the outboard extremity of flanges 102 with the straightening of the curved shape in exterior surfaces 110. This will provide a balanced load sharing between first layer 94 and second layer 96 at the point of maximum deflection. The particular value of distance $A_D$ can be varied so as to allow for increased or decreased pre-determined rates of curvature as ballistic structure 92 becomes deformed when a ballistic article strikes ballistic structure 92.

Joints 138 include intersection points between flanges 102 and first major surface 114 of deformable membrane 104.

Figure 4B:
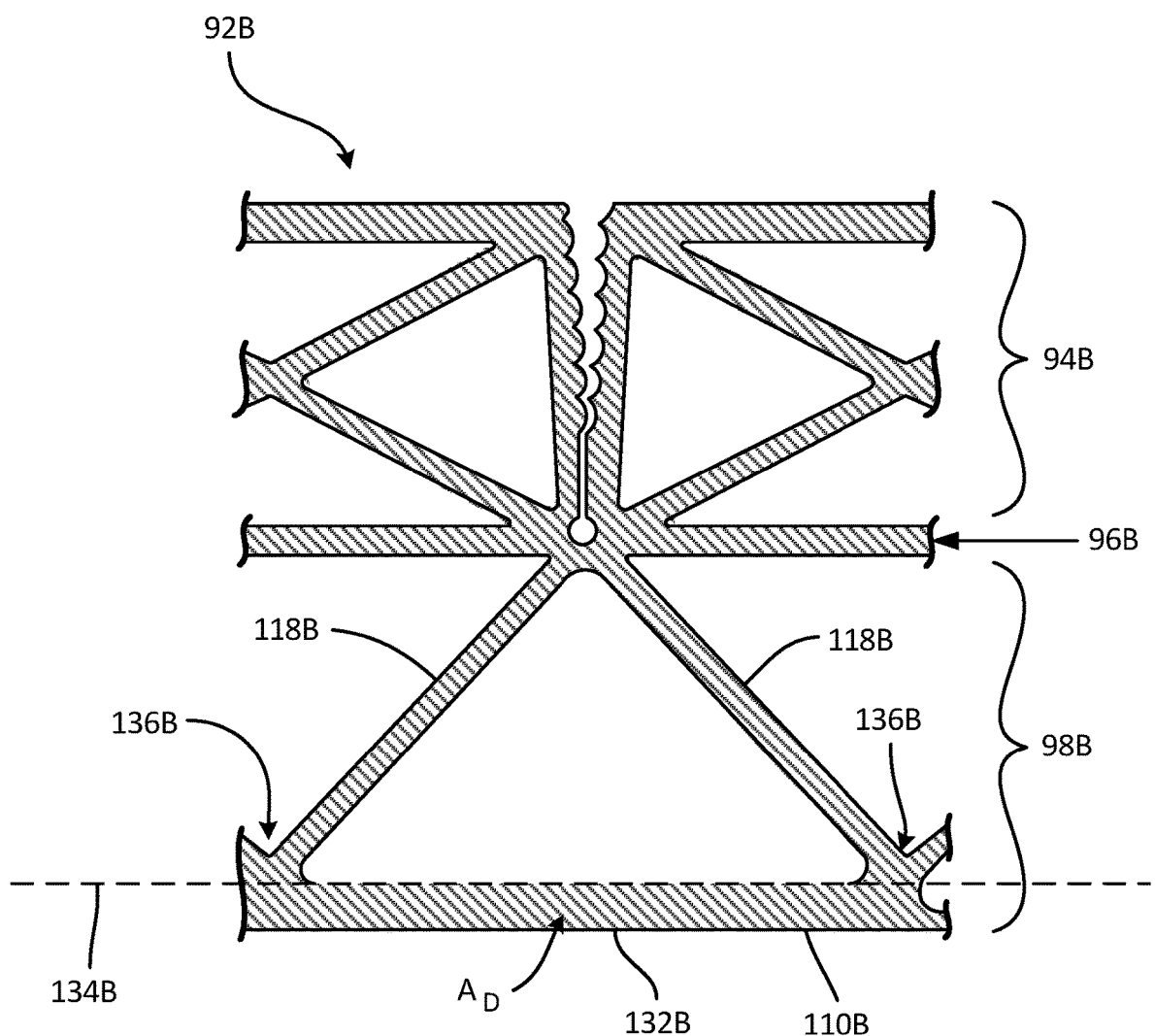
FIG. 4B is a partial cross-sectional view of a ballistic structure according to another embodiment.

FIG. 4B is a partial cross-sectional view of ballistic structure 92B according to another embodiment. Ballistic structure 92B includes exterior surface 110B. Exterior surface 110B includes apex 132B located at a midpoint of exterior surface 110B. Apex 132B is located at distance $A_D$ from plane 134B. Plane 134B includes a series of intersection points 136B between structure elements 118B and exterior surface 110B. In this example, distance $A_D$ includes an absolute value of zero. With the value of distance $A_D$ set to zero, ballistic structure 92B has a high degree of stiffness relative to an example ballistic structure with distance $A_D$ including a value with an absolute value of greater than zero.

Figure 4C:
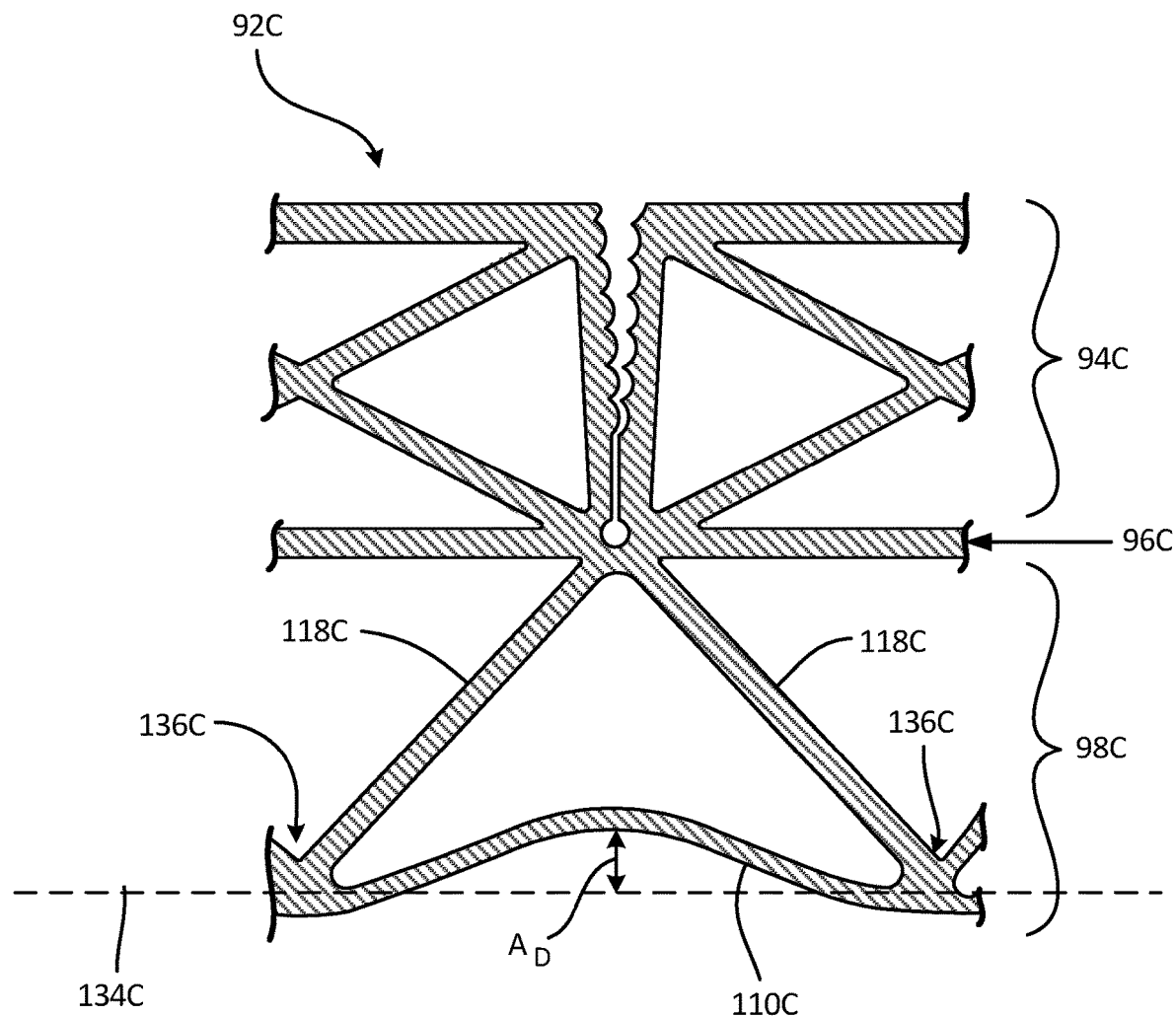
FIG. 4C is a partial cross-sectional view of a ballistic structure according to another embodiment.

FIG. 4C is a partial cross-sectional view of ballistic structure 92C according to another embodiment. Ballistic structure 92C includes exterior surface 110C. Exterior surface 110C includes apex 132C located at a midpoint of exterior surface 110C. Apex 132C is located at distance $A_D$ from plane 134C. Plane 134C includes a series of intersection points 136C between structure elements 118C and exterior surface 110C. In this example, distance $A_D$ includes an absolute value of greater than zero. With the value of distance $A_D$ set to greater than zero, ballistic structure 92C has a lower amount of stiffness relative to an example ballistic structure with distance $A_D$ including a value with an absolute value of zero. FIG. 4C differs from FIG. 4A in that exterior surface is curved towards ballistic structure 92C and ballistic structure 92 form FIG. 4A curves outwards from ballistic structure 92.

Figure 4D:
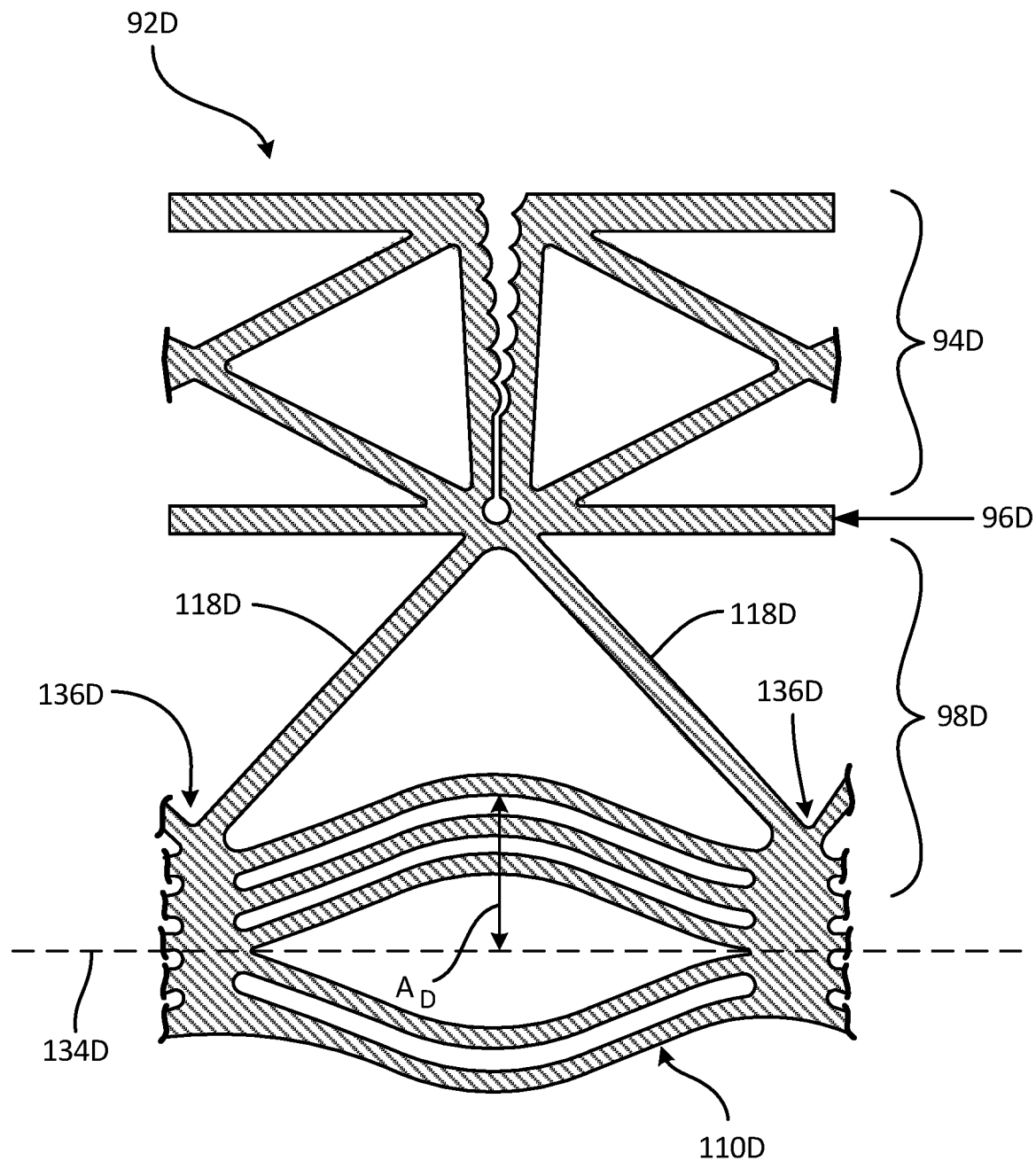
FIG. 4D is a partial cross-sectional view of a ballistic structure according to another embodiment.

FIG. 4D is a partial cross-sectional view of ballistic structure 92D according to another embodiment. Ballistic structure 92D includes exterior surfaces 110D. Exterior surfaces 110D include a plurality of exterior surfaces. In FIG. 4D, exterior surfaces 110D include three exterior surfaces curved upwards towards ballistic structure 92D and two exterior surfaces curved outwards from ballistic structure 92D. The number of exterior surfaces curved upwards towards and/or outwards from ballistic structure 92D may include n number of exterior surfaces, such that the number of exterior surfaces can include 1, 2, 3, 4, . . . , n number of exterior surfaces.

The benefits of the configuration in FIG. 4D include redundant or fail-safe exterior surfaces 110D, where some exterior surfaces 110D may break (or "fail") locally in an extreme ballistic strike, while others remain attached and intact. The quantity of exterior surfaces 110D can be varied to tailor the force damping behavior of ballistic structure 92D.

Figure 5:
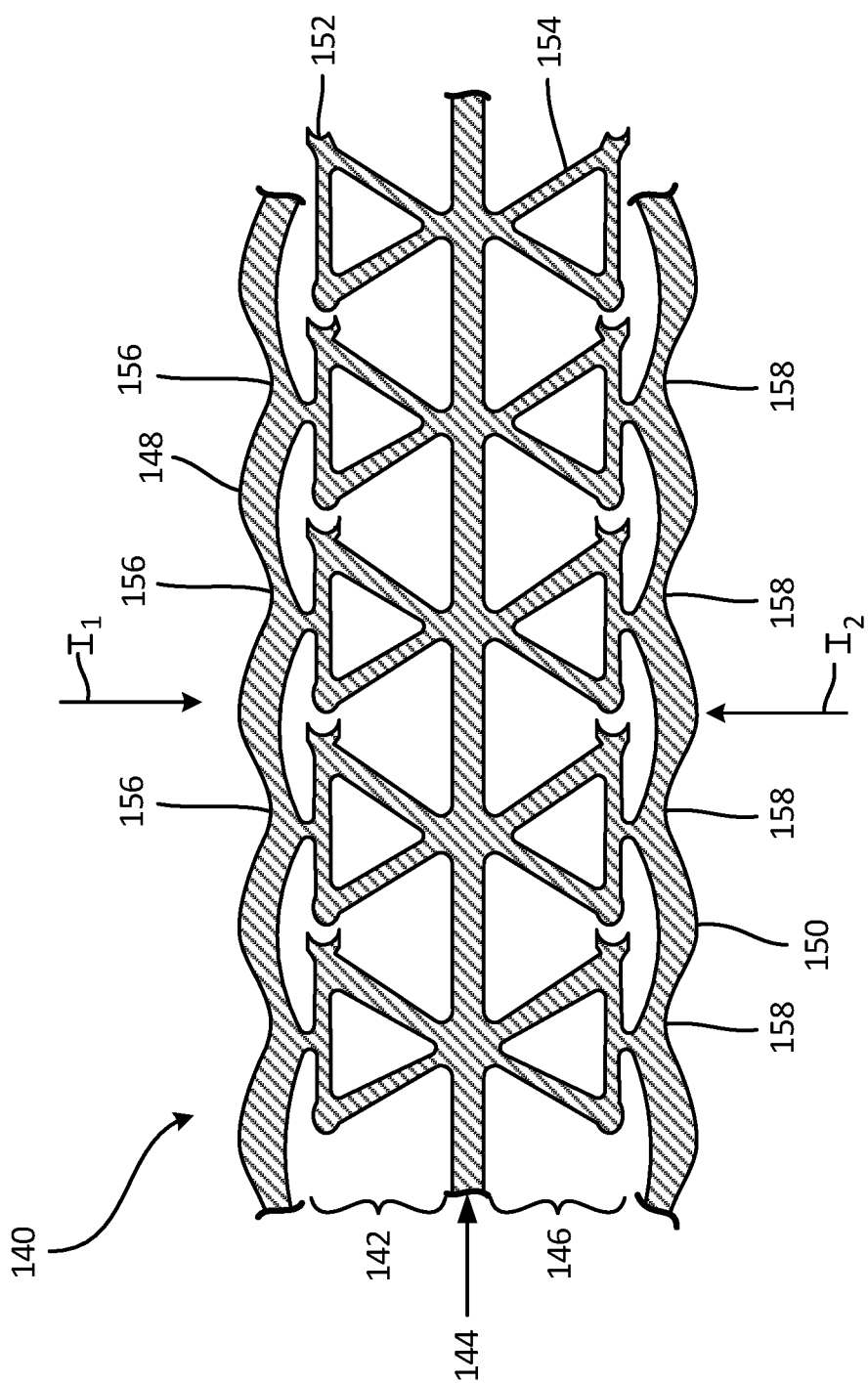
FIG. 5 is a cross-sectional view a ballistic structure according to yet another embodiment.

FIG. 5 is a cross-sectional view of ballistic structure 140 according to yet another embodiment. Ballistic structure 140 includes first layer 142, second layer 144, third layer 146, first webbing 148, and second webbing 150. First webbing 148 is attached to first layer 142 on side 152 of first layer 142 opposite second layer 144. Second webbing 150 is attached to third layer 146 on side 154 of third layer 146 opposite second layer 144. First webbing 148 includes anti-nodes 156 attached to first layer 142. Second webbing 150 includes anti-nodes 158 attached to third layer 146. In this embodiment, first webbing 148 and second webbing 150 include continuous layers with wavy surfaces to provide a progressive energy absorption rate, or a progressive stiffness rate, as first webbing 148 and second webbing 150 are deformed upon ballistic impact. In contrast, second layer 144, is a flat deformable membrane that bends along a series of joints located along second layer 144, does not provide a progressive stiffness rate as second layer 144 is deformed.

Ballistic structure 140 provides the benefit of being able to absorb ballistic impacts from both sides $I_1$ and $I_2$ of ballistic structure 140 as opposed to a single side. FIG. 5 shows upper and lower symmetry, but asymmetrical structures can also be included to tailor performance characteristics particular to individual sides of ballistic structure 140.

The webbing features in FIG. 5 can be added to any of the other ballistic structure provided in any of the figures in this disclosure.

Figure 6:
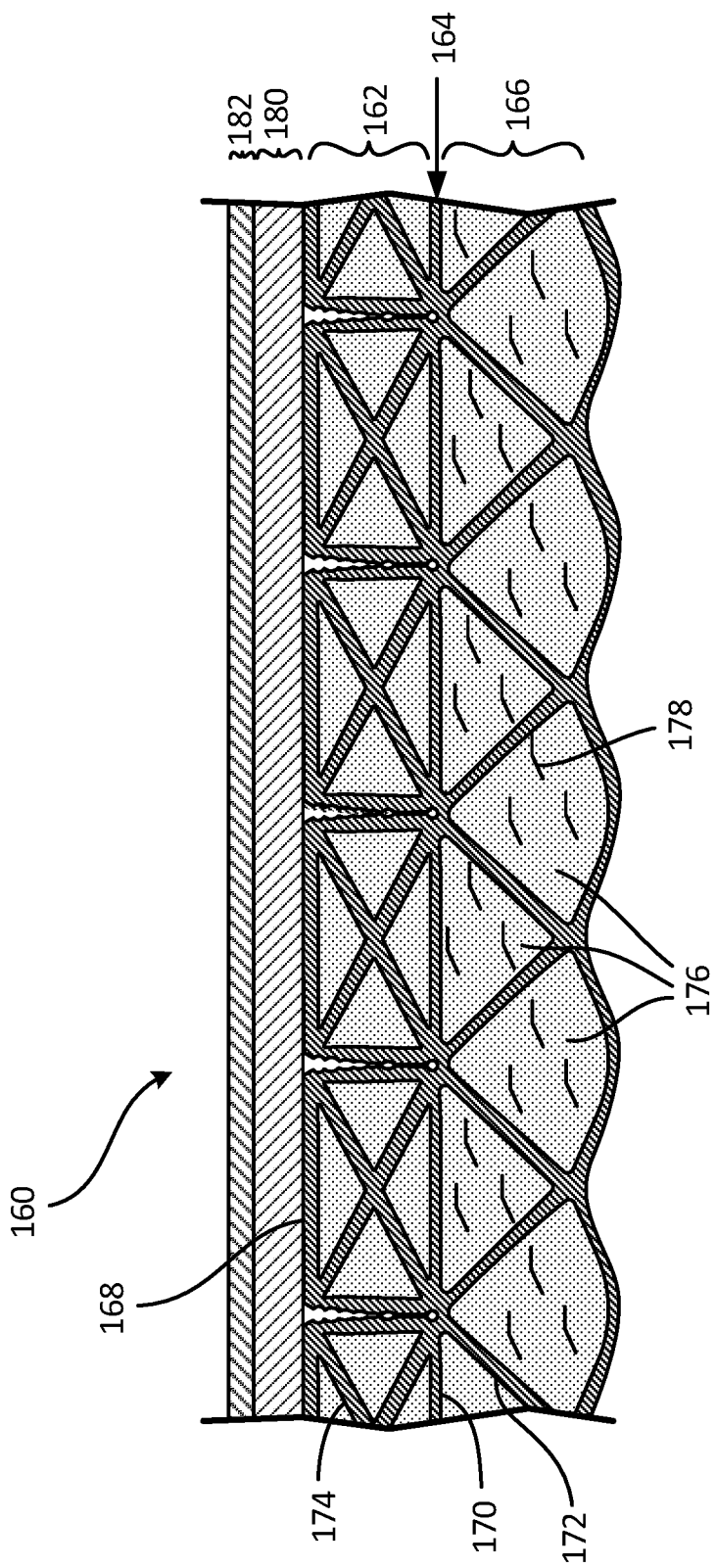
FIG. 6 is a cross-sectional view of a ballistic structure according to yet another embodiment.

FIG. 6 is a cross-sectional view of ballistic structure 160 according to yet another embodiment. Ballistic structure 160 includes first layer 162, second layer 164, and third layer 166. First layer 162 includes a plurality of flanges 168. Second layer 164 includes deformable membrane 170. Third layer 166 includes first internal structures 172. Flanges 168 include second internal structures 174.

First layer 162 and third layer 166 include foam 176. Foam 176 is disposed within first layer 162 and third layer 166. Foam 176 fills spaces between at least some of first internal structures 172 and the spaces between at least some of second internal structures 174. Foam 176 provides additional damping, energy absorption, and ballistic penetration resistance during a ballistic event experienced by ballistic structure 160.

Foam 176 can include elastomer and/or polymer materials, and can also include additional elements such as fibers 178 and/or blowing agents. Foam 176 can be pre-cut and inserted into ballistic structure 160. Foam 176 can also be inserted into ballistic structure 160 in an unsolidified (or uncured) form such that it foam 160 expands and solidifies (or cures) after a period of time after being inserted into ballistic stature 160 or upon a suitable curing step (e.g., thermal, UV, or other treatments).

Ballistic structure 160 also includes fourth layer 180 and fifth layer 182. Fourth layer 180 and fifth layer 182 increase the energy absorption characteristics of ballistic structure 160 by providing layers to initially absorb the energy load upon impact of a ballistic article. The materials of fourth layer 180 and fifth layer 182 can include ceramics, ceramic matrix composites, aramids, aromatic polyamides, and para-aramid synthetic fibers. Additionally, more layers can be added to ballistic structure 160 to meet specific energy absorption characteristics of ballistic structure 160.

The above embodiments provide new, light weight, architecture for structures requiring tailored compliance and energy absorbing characteristics. Possible applications for the above embodiments include fan containment cases, bearing support structures, compliant heat exchanger structure and mounting systems, and turbine disk burst containment systems, as well as non-aircraft applications such as military and law enforcement explosive containment vessels, IED (Improvised Explosive Devices) ballistic armor panels, automotive crumple zone structure and body panels, and facility hardening.

Discussion of Possible Embodiments

The following are non-exclusive descriptions of possible embodiments of the present invention.

An apparatus can include first, second, and third layers. The first layer can include a plurality of flanges. The second layer can include a deformable membrane. The second layer can be connected to the first layer along a first major surface of the deformable membrane. The third layer can be connected to the second layer along a second major surface of the deformable membrane opposite the first major surface. The third layer can include a first series of internal structures.

The apparatus of the preceding paragraph can optionally include, additionally and/or alternatively, any one or more of the following features, configurations and/or additional components:

a further embodiment of the foregoing apparatus, wherein the plurality of flanges further can include a second series of internal structures;

a further embodiment of any of the foregoing apparatuses, wherein the apparatus can further include a foam disposed in at least one of the first set of internal structures and the second set of internal structures, wherein the foam can include a type of foam selected from the group consisting of an expanding foam and a pre-cut foam;

a further embodiment of any of the foregoing apparatuses, wherein the foam can further include a material selected from the group consisting of solid elastomers, solid polymers, and ballistic fibers;

a further embodiment of any of the foregoing apparatuses, wherein each of the plurality of flanges further can include a first face and a second face on an opposite side of the flange as the first face, further wherein each of the first face and the second face can form either an acute angle or an obtuse angle with a plane of the deformable membrane in an un-deformed state;

a further embodiment of any of the foregoing apparatuses, wherein the first face of each of the plurality of flanges can include a first nesting feature and the second face of each of the plurality of flanges can include a second nesting feature, and further wherein the first nesting feature can be configured to receive the second nesting feature;

a further embodiment of any of the foregoing apparatuses, wherein the first nesting feature can include a series of grooves and the second nesting feature can include a series of tongues shaped so as to engage with the series of grooves of the first nesting feature;

a further embodiment of any of the foregoing apparatuses, wherein each of the first series of internal structures can include structure elements that form a triangle with and that can be connected to the second major surface of the deformable membrane;

a further embodiment of any of the foregoing apparatuses, wherein each of the first series of internal structures can include a plurality of surfaces opposite the deformable membrane;

a further embodiment of any of the foregoing apparatuses, wherein each of the first series of internal structures can include an exterior surface opposite the deformable membrane;

a further embodiment of any of the foregoing apparatuses, wherein each of the exterior surfaces of each of first series of internal structures can include an apex that can be located at a midpoint of the exterior surface and at a distance $A_D$ from a plane of intersection points of first the series of internal structures, wherein the intersection points can include points of intersection between individual structure elements and the exterior surface, and further wherein the distance $A_D$ can include an absolute value of zero greater than zero;

a further embodiment of any of the foregoing apparatuses, wherein each of the first layer, second layer, and third layer can include a metallic material selected from the group consisting of aluminum, titanium, nickel, steel, and alloys thereof;

a further embodiment of any of the foregoing apparatuses, wherein the apparatus may further comprise an additional layer, wherein a material of the additional layer can be selected from the group consisting of ceramics, ceramic matrix composites, aramids, aromatic polyamides, and para-aramid synthetic fibers;

a further embodiment of any of the foregoing apparatuses, wherein the apparatus may further comprise a first webbing attached to the first layer on a side of the first layer opposite the second layer; and a second webbing attached to the third layer on a side of the third layer opposite the second layer;

a further embodiment of any of the foregoing apparatuses, wherein the first webbing can include a first set of anti-nodes attached to the first layer, and further wherein the second webbing can include a second set of anti-nodes attached to the third layer; and/or a further embodiment of any of the foregoing apparatuses, wherein the apparatus may further comprise a frame, wherein the first layer, second layer, and third layer can be disposed within the frame, and further wherein the frame can surround longitudinal edges of the first, second, and third layers.

A method can include receiving a ballistic article with a structure. The structure can be deformed to absorb energy from the ballistic article. A first layer of the structure can be displaced towards a second layer and a third layer of the structure. The second layer can be bent at joints formed at intersection points of flanges in the first layer and the second layer. An external surface of the third layer can be extended such that at least a portion of the external surface of the third layer can be changed from a sinusoidal shape to either a first shape with a generally uniform curvature or a second shape with substantially straight portions between intersection points.

The method of the preceding paragraph can optionally include, additionally and/or alternatively, any one or more of the following features, configurations and/or additional components:

a further embodiment of the foregoing method, wherein the method can further include compressing adjoining flanges disposed along the first layer of the structure;

a further embodiment of any of the foregoing methods, wherein compressing adjoining flanges can further include engaging nesting features disposed on faces of adjoining flanges;

a further embodiment of any of the foregoing methods, wherein engaging the nesting features can further include frictionally damping relative motion between adjoining flanges; and/or a further embodiment of any of the foregoing methods, wherein extending the external surface of the third layer can further include curving the external surface of the third layer to a pre-determined amount of curvature.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus comprising:
   a first layer including a plurality of flanges, wherein each of the plurality of flanges further comprises a first face and a second face on an opposite side of the flange as the first face, wherein the first face of each of the plurality of flanges includes a first nesting feature and the second face of each of the plurality of flanges includes a second nesting feature;
   a second layer including a deformable membrane, wherein the second layer is connected to the first layer along a first major surface of the deformable membrane; and
   a third layer connected to the second layer along a second major surface of the deformable membrane opposite the first major surface, wherein the third layer comprises a first series of internal structures.

2. The apparatus of claim 1, wherein the plurality of flanges further comprises a second series of internal structures.

3. The apparatus of claim 2 further comprising a foam disposed in at least one of the first set of internal structures and the second set of internal structures, wherein the foam comprises an expanding foam.

4. The apparatus of claim 3, wherein a material of the foam comprises ballistic fibers.

5. The apparatus of claim 1, wherein each of the first face and the second face form either an acute angle or an obtuse angle with a plane of the deformable membrane in an un-deformed state.

6. The apparatus of claim 1, wherein a shape of the first nesting feature corresponds to a shape of the second nesting feature, wherein the first nesting feature and second nesting feature are separated by a space when the deformable membrane is in the un-deformed state.

7. The apparatus of claim 6, wherein the first nesting feature includes a series of grooves and the second nesting feature includes a series of tongues shaped so as to engage with the series of grooves of the first nesting feature.

8. The apparatus of claim 1, wherein each of the first series of internal structures includes structure elements that form a triangle with and are connected to the second major surface of the deformable membrane.

9. The apparatus of claim 8, wherein each of the first series of internal structures includes a plurality of surfaces opposite the deformable membrane.

10. The apparatus of claim 8, wherein each of the first series of internal structures includes an exterior surface that is on an opposite side of the third layer from the deformable membrane.

11. The apparatus of claim 10, wherein each of the exterior surfaces of each of the first series of internal structures includes an apex located at a midpoint of the exterior surface and at a distance $A_D$ from a plane of intersection points of the first series of internal structures, wherein the intersection points include points of intersection between individual structure elements and the exterior surface, and further wherein the distance $A_D$ has an absolute value of greater than zero.

12. The apparatus of claim 1, wherein each of the first layer, second layer, and third layer comprise a metallic material selected from the group consisting of aluminum, titanium, nickel, steel, and alloys thereof.

13. The apparatus of claim 1 further comprising:
   an additional layer, wherein a material of the additional layer is selected from the group consisting of ceramics, ceramic matrix composites, aramids, aromatic polyamides, and para-aramid synthetic fibers.

14. The apparatus of claim 1, wherein the apparatus further comprises:
   a first webbing attached to the first layer on a side of the first layer that is on an opposite side of the first layer from the second layer; and
   a second webbing attached to the third layer on a side of the third layer that is on an opposite side of the third layer from the second layer.

15. The apparatus of claim 14, wherein the first webbing includes a first set of anti-nodes attached to the first layer, and further wherein the second webbing includes a second set of anti-nodes attached to the third layer.

16. The apparatus of claim 1 further comprising a frame, wherein the first layer, second layer, and third layer are disposed within the frame, and further wherein the frame surrounds longitudinal edges of the first, second, and third layers.

17. The apparatus of claim 1, wherein the third layer further comprises an external surface that occupies a generally sinusoidal shape when the deformable layer is in an un-deformed state.

* * * * *